US 6,675,242 B2

(12) United States Patent
Benson et al.

(10) Patent No.: US 6,675,242 B2
(45) Date of Patent: Jan. 6, 2004

(54) COMMUNICATION BUS CONTROLLER INCLUDING DESIGNATION OF PRIMARY AND SECONDARY STATUS ACCORDING TO SLOT POSITION (75) Inventors: Anthony J Benson, Roseville, CA (US); James Lawrence White, Roseville, CA (US); Dovard K Howard, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 09/811,196

(22) Filed: Mar. 17, 2001

(65) Prior Publication Data
US 2002/0184424 A1 Dec. 5, 2002

(51) Int. Cl.$^7$ .................. G06F 13/00; G06F 15/177; G06F 11/00; G06F 3/00
(52) U.S. Cl. .................. 710/104; 710/10; 713/1; 713/100; 714/5
(58) Field of Search .................. 710/100, 300–304, 710/104, 8–19; 713/1, 2, 100; 714/3–14

(56) References Cited
U.S. PATENT DOCUMENTS

| 5,544,222 | A | * | 8/1996 | Robinson et al. | 455/557 |
| 5,768,623 | A | * | 6/1998 | Judd et al. | 710/37 |
| 6,055,582 | A | * | 4/2000 | Pascarella et al. | 710/14 |
| 6,073,218 | A | * | 6/2000 | DeKoning et al. | 711/150 |
| 6,173,341 | B1 | * | 1/2001 | Emerson et al. | 710/8 |
| 6,219,727 | B1 | * | 4/2001 | Kailash et al. | 710/48 |
| 6,230,200 | B1 | * | 5/2001 | Forecast et al. | 709/226 |
| 6,253,334 | B1 | * | 6/2001 | Amdahl et al. | 714/4 |
| 6,321,277 | B1 | * | 11/2001 | Andresen et al. | 710/8 |
| 6,460,149 | B1 | * | 10/2002 | Rowlands et al. | 714/43 |
| 2002/0083249 | A1 | * | 6/2002 | Brown et al. | 710/240 |
| 2002/0098869 | A1 | * | 7/2002 | Strusaker et al. | 455/561 |

* cited by examiner

Primary Examiner—Sumati Lefkowitz (57) ABSTRACT

A communication system with a plurality of interface slots includes control logic for determining and designating the status of one or more controller cards inserted in one of the slots such that: a controller card is designated as the primary card if it is inserted in an interface slot while the other slots are empty; a controller card in an interface slot with primary status retains its primary status while other controller cards are added or removed from the system; a controller card in an interface slot with a non-primary status assumes primary status if the controller card with non-primary status is plugged in a slot that after a power interruption is designated as the slot to assume primary status, or the controller card with primary status is removed from the system.

18 Claims, 3 Drawing Sheets

COMMUNICATION BUS CONTROLLER INCLUDING DESIGNATION OF PRIMARY AND SECONDARY STATUS ACCORDING TO SLOT POSITION

CROSS-REFERENCES

The present invention is related to subject matter disclosed in the following co-pending patent applications, the contents of which are incorporated by reference herein in their entirety:

1. U.S. patent application entitled, "Redundant, High-Availability Storage System" Ser. No. 09/811,194, naming Anthony J. Benson and James J. deBlanc as inventors and filed on even date within.
2. U.S. patent application entitled, "System and Method for Data Corruption Avoidance" Ser. No. 09/810964, naming Anthony J. Benson and Patrick McGoey as inventors and filed on even date within.
3. U.S. patent application entitled, "Multiple-Path Interface Card for Interfacing Multiple Isolated Interfaces to a Storage System" Ser. No. 09/811,193, naming Anthony J. Benson and James J. deBlanc as inventors and filed on even date within.
4. U.S. patent application entitled, "DIP Switch Configuration for Increased Usability with Multiple Cards" Ser. No. 09/810,965, naming Anthony J. Benson, Chadi Theodossy, and Joanna Baisden as inventors and filed on even date within.
5. U.S. patent application entitled, "Circuit for Switching One or More HVD Transceivers" Ser. No. 09/811,192, naming Anthony J. Benson as inventor and filed on even date within.
6. U.S. patent application entitled, "Management of Communication Bus Resets" Ser. No. 09/810,963, naming Anthony J. Benson, James L. White and Dovard K. Howard as inventors and filed on even date within.
7. U.S. patent application entitled, "Management of Resets For Interdependent Dual Small Computer Standard Interface (SCSI) Bus Controllers" Ser. No. 09/605,161, Anthony J. Benson, et al., filed on Jun. 27, 2000.

BACKGROUND

This invention generally relates to the field of computing and data communications and, more particularly, to management of communication bus controller cards used to control data communications between a computing system and one or more peripheral devices.

A computing system may be connected to one or more peripheral devices, such as data storage devices, printers, and scanners. In a computing environment, an interface mechanism connects a computing system with the peripheral devices. The interface mechanism typically includes a data communication bus to which the devices and the computing system attach. The communication bus allows the computing system and the peripheral devices to communicate in an orderly manner. One or more communication buses may be utilized in a system.

Typically, a logic chip, known as a bus controller, monitors and manages data transmission between the computing system and the peripheral devices by prioritizing the order and the manner in which said devices take over and access the communication buses. In various interface mechanisms, control rules, also known as communication protocols, are implemented to promote the communication of information between computing systems and peripheral devices. For example, Small Computer System Interface or SCSI (pronounced "scuzzy") is an interface mechanism that allows for the connection of multiple (e.g., up to 15) peripheral devices to a computing system. SCSI is widely used in computing systems, such as desktop and mainframe computers.

The advantage of SCSI in a desktop computer is that peripheral devices, such as scanners, CDs, DVDs, and Zip drives, as well as hard drives can be added to one SCSI cable chain. The distinct advantage of SCSI is its use in network servers where several hard drives can be easily configured as fault-tolerant clusters. That is, in the event one drive fails, it can be removed from the SCSI bus, and a new one inserted without loss of data even while the system is still operational. A fault-tolerant communication system is generally designed to detect faults, such as power interruption or removal or insertion of peripherals, so that it can reset the appropriate system components to retransmit any lost data.

SCSI peripherals can be also daisy chained together. In a daisy chain environment an intermediate device has two ports. The first port connects to a computing system or another intermediate device attached to a computing system. The first port allows the device to communicate with the computing system. The second port is either terminated (i.e., not attached to anything) or attached to another device and allows for the computing system and the other device to communicate through the intermediate device. Thus, one or more devices can be attached in a line using a SCSI communication bus.

A SCSI communication bus uses the SCSI protocol for data communications. Hardware implementation of a SCSI communication bus is generally done using a 50 conductor flat ribbon or round bundle cable of characteristic impedance of 100 Ohm. The nominal distance is six meters in single ended mode and 25 meters in differential mode. Currently, a SCSI communication bus includes a bus controller included on a single expansion board that plugs into the host computing system. The expansion board is referred to as a "SCSI host adapter".

In some embodiments, single SCSI host adapters are also available with two controllers that can support up to 30 peripherals. The SCSI host adapters can connect to an enclosure housing multiple devices. In the mid-range to high-end markets, the enclosure may have "interface cards" or "controller cards" providing connection paths from the host adapter to SCSI busses resident in the enclosure. These controller cards can also provide bus isolation, configuration, addressing, bus reset, and fault detection functionalities for the enclosure.

One or more controller cards may be plugged in or unplugged from the backplane while data communication is in process. The insertion and removal of peripheral devices or controller cards to the backplane while the computing system is operating is referred to as "hot plugging." For more information on the SCSI protocol and implementations, please refer to the "American National Standard for SCSI-2," available as Document X3.181–199X from Global Engineering Documents, 2805 McGaw, Irvine, Calif. 92174, hereby incorporated by reference herein in its entirety.

If more than one controller card is present, one of the controller cards needs to be designated as the primary controller card or the master, the other controller cards would be designated as non-primary cards or slaves. This role assignment is needed so that a single central control logic can control and manage the operation of the buses in the system. Under certain conditions, such as power interruption, or attachment or detachment of one or more controller cards to the backplane, the designated status of the controller cards may be lost or confused. A method is needed to determine and designate the proper status to each card under such conditions.

SUMMARY

Systems and corresponding methods for generating signals to determine and designate the status of a controller card in a communication interface are provided. In one aspect of the invention, a communication interface is implemented between a computing system and one or more peripherals that includes an interconnection backplane with at least two interface slots. Each slot receives one or more controller cards and connects the controller cards to one or more communication buses. Each communication bus includes communication ports for attachment to one or more peripheral devices. The controller cards manage the operation of the communication buses.

The controller cards include one or more bus controllers including logic circuitry for determining the status of the controller card and generating bus reset signals under certain conditions, such as power interruption or change in system configuration. A controller card may be designated to have a primary status (i.e., master) or a non-primary status (i.e., slave). The card with the primary status is responsible for controlling the communication buses by driving and initiating bus addresses if any of the following events occurs: the system's power is interrupted, a device is inserted or removed from the buses, or a controller card is removed or added to the system. The non-primary card also resets the buses in case of a power interruption and takes over the control of the communication buses when the primary controller card is removed from the system or disabled.

In accordance with one or more aspect of the invention, a communication system with a plurality of interface slots includes control logic for determining and designating the status of one or more controller cards inserted in one of the slots such that: a controller card is designated as the primary card if it is inserted in an interface slot while the other slots are empty; a controller card in an interface slot with primary status retains its primary status while other controller cards are added or removed from the system; a controller card in an interface slot with a non-primary status assumes primary status if: the controller card with non-primary status is plugged in a slot that after a power interruption is designated as the slot to assume primary status, or the controller card with primary status is removed from the system.

The invention will be more fully understood upon consideration of the detailed description below, taken together with the accompanying figures.

DETAILED DESCRIPTION

Figure 1:
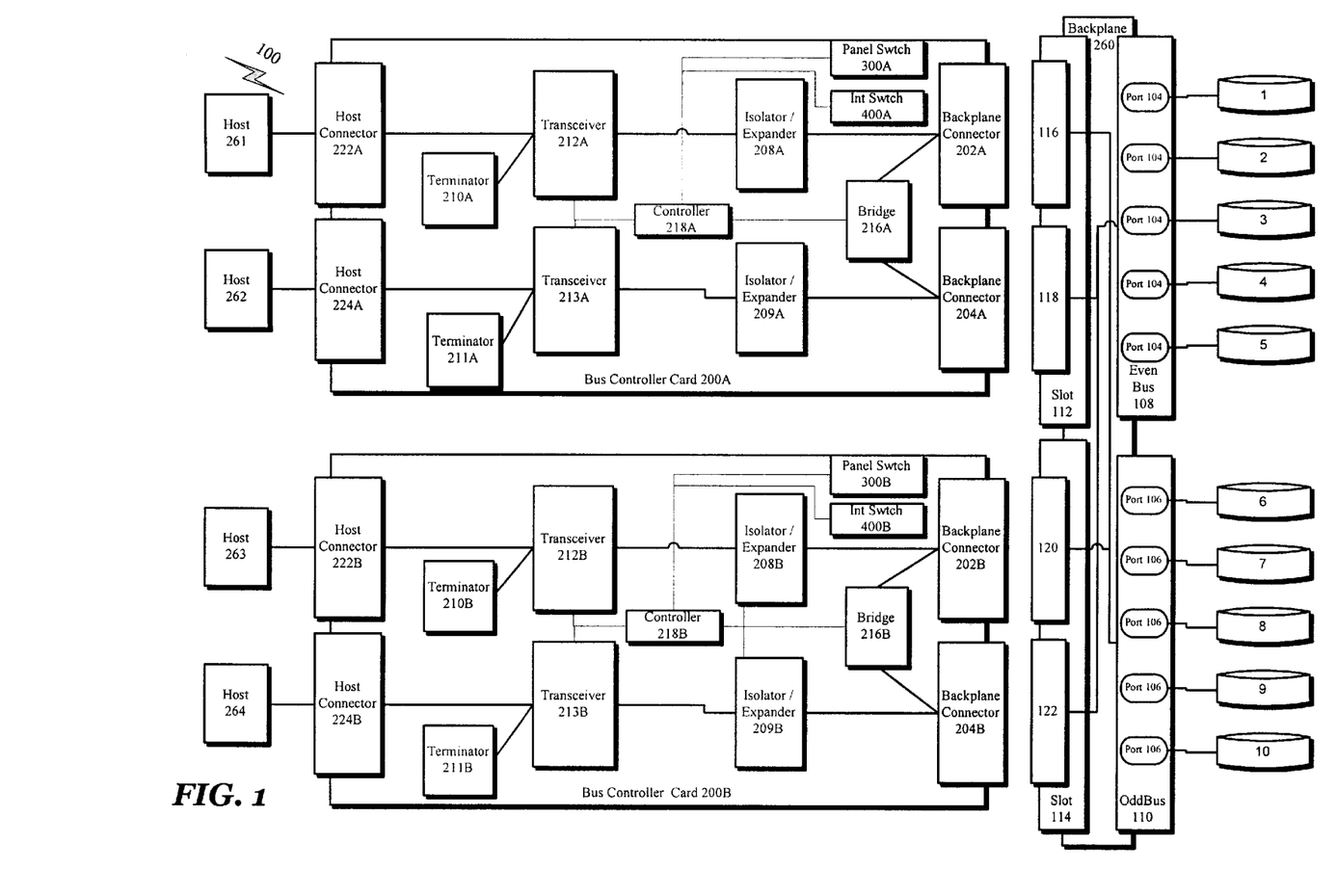
FIG. 1 is a block diagram of a communication environment and the associated interface mechanism with two controller cards connected to a backplane having even and odd communication buses, each bus having two interface slots for interfacing with two controller cards, in accordance with one or more embodiments of the invention.

FIG. 1 illustrates a schematic of a communication system 100, including bus controller cards 200A and 200B in relation with peripheral devices 1 through 10 and the corresponding data interface mechanisms. The data interface mechanisms include a backplane 260 upon which other communication components are implemented. Backplane 260 is, typically, a printed circuit board that may be utilized as a component within other assemblies, such as peripheral devices 1 through 10. In certain embodiments of the system, backplane 260 includes at least two interface slots 112 and 114, for example, that allow controller cards 200A and 200B to electrically connect to backplane 260.

Even and odd buses 108 and 110 are implemented on top of backplane 260 to promote data communication between peripheral devices 1 through 10 and computing systems (e.g., hosts 261, 262, 263, and 264) attached to backplane 260 via bus controller cards 200A and 200B. Bus controller cards 200A and 200B, as well as even and odd buses 108 and 110, can communicate using the SCSI communication protocol, for example. As such, system 100, in accordance with one or more embodiments of the invention, may be described and operate in conformity with SCSI standards. However, the system may include other types of communication interfaces and operate in accordance with other communication protocols, if desired.

Even bus 108, advantageously, includes a number of ports 104. Odd bus 110, similarly includes plurality of ports 106. Ports 104 and 106 can each have the same physical configuration. The ports 104, 106 are adapted to connect to a peripheral device, such as a disk drive, for example. Ports 104 and 106 may be divided among even and odd buses 108 and 110 and other arrangements if desired, and are not limited to the exemplary embodiment illustrated in FIG. 1.

A first interface slot 112 (also referred to as bus controller slot 112) and a second interface slot 114 (also referred to as bus controller slot 114) are included on backplane 260. The first bus controller slot 112 includes a first connector 116 electrically connected to odd bus 110 and a second connector 118 electrically connected to even bus 108. The second bus controller slot 114 includes a first connector 120 electrically connected to odd bus 110 and a second connector 122 electrically connected to even bus 108. Connectors 116, 118 in the first bus controller slot 112 are physically and electrically configured to receive a first bus controller card. The connectors 120, 122 in the second bus controller slot 114 are also physically and electrically configured to receive a second bus controller card.

In some embodiments, even bus 108 and odd bus 110 are connected through one or more bus controller cards inserted into the first bus controller slot 112 and/or the second bus controller slot 114. That is, even bus 108 is separated physically and electrically from odd bus 110, such that the connection or connections between the even and odd busses 108 and 110 are made via one or more bus controller cards.

Bus Controller Cards Hardware Implementation

Referring as well to FIG. 1, schematics of bus controller cards 200A and 200B are shown. In one or more embodiments, bus controller cards 200A and 200B are physically and electrically adapted to be received by either the first bus controller slot 112 or the second bus controller slot 114. Bus controller cards 200A and 200B each include a pair of backplane connectors, respectively backplane connectors 202A, 204A, and backplane connectors 202B, 204B, as shown. Each bus controller card 200A or 200B is physically and electrically adapted to interface with connectors 116 and 118 in the first bus controller slot 112, or the connectors 120 and 122 in the second bus controller slot 114, for example. Backplane connectors 202A and 204A or 202B and 204B may be any type of connector useful for electrically linking cards 202A and 202B to backplane 260. In one embodiment, the backplane connectors are 240 pin count connectors available from Berg-Metral, part number 73981-102.

Host connectors 222A and 224A are electrically connected to bus controller card 200A. Similarly, host connectors 222B and 224B are electrically connected to bus controller card 200B. Host connectors 222A, 224A, 222B, and 224B are adapted, respectively, for connection to host computers 261, 262, 263, and 264, for example. In embodiments of the system, bus controller cards 200A and 200B provide an independent channel of communication between each host and communication buses implemented on backplane 260. Cards 200A and 200B may include one or more electrical components, depending on implementation. Host connectors 222A, 224A, 222B, and 224B receive voltage-differential input or transmit voltage-differential output. Even and odd buses 108 and 110 can be SCSI buses or similar single-ended buses, for example.

Controller cards 200A and 200B respectively include a transceivers 212A and 212B. Transceivers 212A and 212B are associated with backplane connectors 202A and 202B, respectively. Transceivers 212A and 212B convert the voltage levels of differential signals to the voltage level of signals utilized on a single-ended bus. In one embodiment, transceivers 212A and 212B are 9-Channel Differential Transceivers from Texas Instruments, part number SN75976A. Cards 200A and 200B may include terminators 210A and 210B, respectively, associated with backplane connectors 202A and 202B respectively. The terminators are required at an end of a SCSI or other single-ended bus to signal the terminal end of the bus. In one embodiment, the terminators are DS2108 terminators from Dallas Semiconductor.

Further, cards 200A and 200B may also include isolators/expanders 208A and 208B, respectively, used to electrically isolate and retime signals on a single-ended bus, such as SCSI signals. Isolators/expanders 208A and 208B can isolate even and odd buses 108 and 110 from the circuitry on one or both cards 200A and 200B. Isolator/expander 208A is located between, and electrically connected to both, backplane connector 202A and transceiver 212A. In one embodiment, isolator/expander 208A is an integrated circuit from LSI Logic, part number SYM53C140. Isolator/expander 208B is similarly connected in card 200B, in accordance with one or more embodiments.

Backplane connectors 204A and 204B are electrically connected to host connectors 224A and 224B, respectively. Host connectors 224A and 224B are adapted for connection to host computers 262 and 264, for example. Cards 200A and 200B may also include transceivers 213A and 213B and isolator/expanders 209A and 209B, respectively. As shown, isolator/expanders 209A is located between and electrically connected to backplane connector 204A and transceiver 213A. Likewise, isolator/expanders 209B is located between and electrically connected to backplane connector 204B and transceiver 213B. Thus, as shown, each host can connect to one of the buses 108 or 110 through an independent communication channel implemented in bus controller cards 200A or 200B, wherein the independent communication channel includes at least one or more of the following components: a host connector, a transceiver, an isolator/expander, and a backplane connector.

Second terminators 211A and 211B, may be respectively included in cards 200A and 200B, in association with backplane connectors 204A and 204B, respectively. Furthermore, each card 200A and 200B may include a bridge 216A or 216B, as shown. Bridges 216A and 216B provide a controllable connection between the even bus 108 and the odd bus 110. In one embodiment, bridges 216A and 216B may be respectively included in the same integrated circuit as isolator/expanders 208A, 208B and 209A, 209B. Bridge 216A connects isolator/expanders 208A and 209A. Similarly, bridge 216B connects isolator/expanders 208B and 209B. In certain embodiments however, bridges 216A and 216B may connect even bus 108 to odd bus 110 at a different location on cards 200A and 200B. In some embodiments, card 200B may not include bridge 216B if card 200A includes bridge 216A. The opposite configuration may also be true, if desired. That is, card 200A may not include bridge 216A. As such, system 100 can be implemented with one bridge for connecting even bus 108 and odd bus 110.

When one of the bridges 216A or 216B is activated, cards 200A and 200B are said to be bridged (i.e., bridged mode). When neither of the bridges 216A or 216B are activated, cards 200A and 200B are said to be split (i.e., split mode). In bridged mode, a host attached to one of the cards can communicate with peripheral devices attached to both cards. For example, if cards 200A and 200B are bridged with host 261 connected to card 200A, then host 261 can communicate with peripheral devices 1 through 10. However, if cards 200A and 200B are split, then host 261 can communicate with peripheral devices 1 through 5.

A controller 218A may also be included on card 200A. Controller 218A is electrically connected to the other components on card 200A, such as backplane connectors 202A, 204A, host connectors 206A, 214A, transceivers 212A, 213A, terminators 210A, 211A, isolator/expanders 208A, 209A and bridge 216A. The connection between controller 218A and the other components on card 200A is advantageously made by connecting to the circuitry on card 200A that is in place to interlink those components, but may be made directly to each component, if desired. Controller 218A receives signals from and transmits command signals to those components on card 200A. Accordingly, a controller 218B may be included on card 200B with similar electronic connectivity and functionality as that described for controller 218A. In one embodiment, controllers 218A and 218B are Programmable Logic Device (PLD) integrated circuits from Altera, part number EPF6016A0C208-2, for example.

The logic chips and circuitry described here may also be implemented using Field Programmable Gate Arrays (FPGAs) or Application Specific Integrated Circuit (ASICs). A FPGA is a PLD with a high density of gates. An ASIC is a chip that is custom designed for a specific application rather than a general-purpose chip. The use of FPGAs and ASICs improves the performance of the system over general-purpose CPUs, because these logic chips are hard-wired to perform a specific task and do not incur the overhead of fetching and interpreting stored instructions.

Panel switches 300A, 300B and internal switches 400A and 400B, may be also included in cards 200A and 200B, respectively. The switches can be set in various to configurations to promote the desired functionality within system 100. Certain embodiments of system 100 may also include reset circuitry (not shown) on cards 200A and 200B, respectively. The reset circuitry is used to generate reset signals to inform the system of certain conditions (e.g., power interruption, control card or peripheral detachment from the system) so that data loss and/or data corruption can be detected and prevented. The reset circuitry can be independently implemented or integrated in other system components such as controllers 218A and 218B, in accordance with one or more aspects of the invention. Similarly, other components on cards 200A and 200B have been discussed as separate and discrete components. These components, however, may be combined to form larger or different integrated circuits or electrical assemblies, if desired.

Interface Slots

Figure 2:
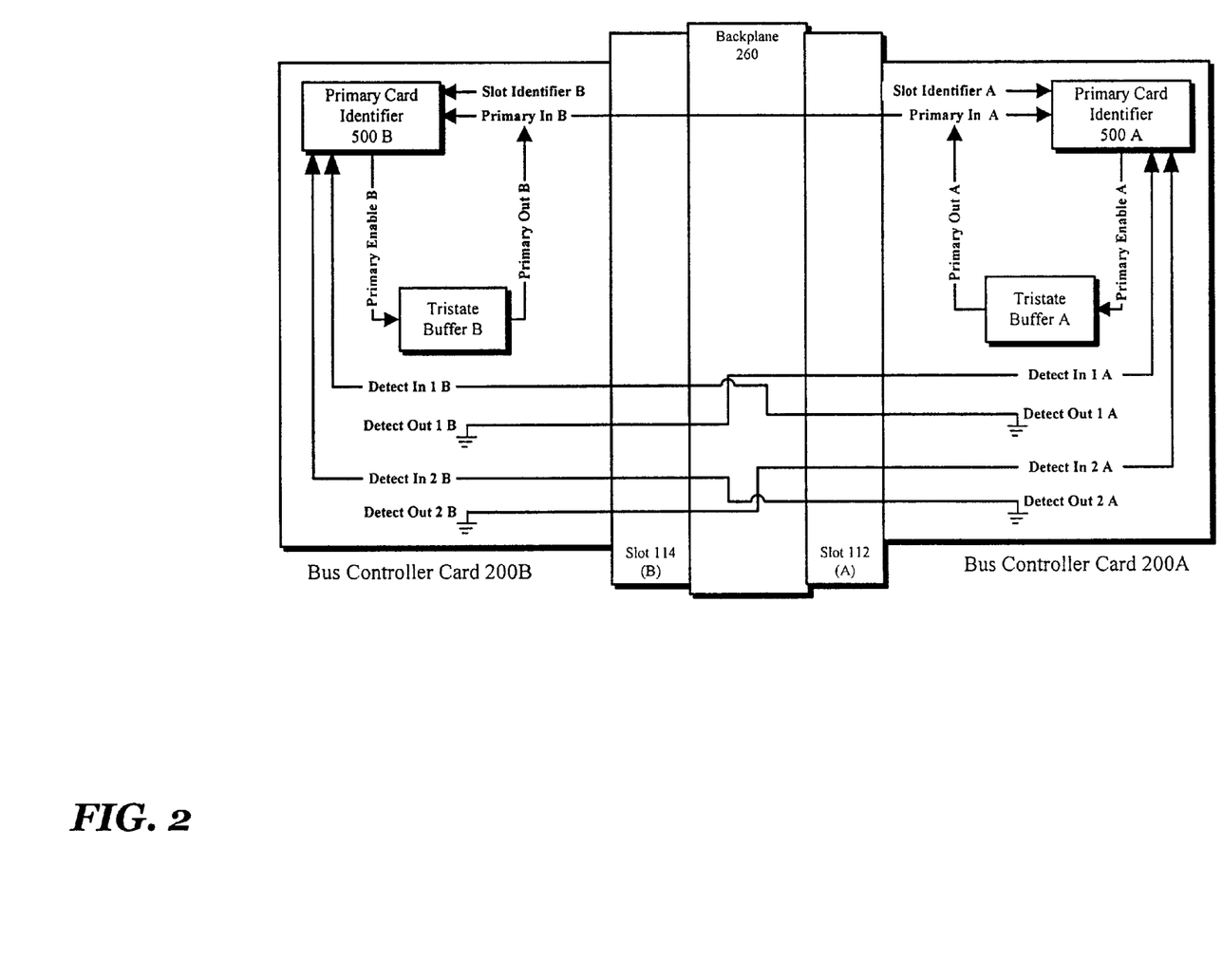
FIG. 2 is a block diagram of the interface mechanism of FIG. 1, in accordance with one or more aspects of the invention, illustrating the electrical connection between the controller cards and the backplane.

Referring to FIG. 2, interface slots 112 and 114 (also referred to as bus controller slots 112 and 114) are electrically connected and implemented to interact and communicate with logic chips included on bus controller cards 200A and 200B and components of backplane 260, as shown. In accordance with one aspect of the system, controllers 218A and 218B (FIG. 1) are logic chips that include logic circuitry for configuring the status of controller cards 200A and 200B depending on the type of action or event taking place. As explained in further detail below, these actions or events can include: attaching to or removing one or more peripheral devices to or from the system; attaching to or removing one or more controller cards to or from the system; and powering up the system.

As stated earlier, at any given time, one of the controller cards 200A or 200B assumes primary status and acts as the central control logic unit that manages the configuration of system 100's components. Having none or more than one control logic unit is not conducive to efficient management of a communication bus system. Implementing a system with more than one control logic unit requires maintenance of sophisticated arbitration algorithms and other overhead that are expensive to design and maintain. Embodiments of the invention, however, may be implemented to include such arbitration algorithms and more than two controller cards. In certain embodiments, at least one controller card assumes primary status as further described herein. The card with the primary status is also referred to as the master card. The cards that assume non-primary status are also referred to as slave cards.

Referring to FIGS. 1 and 2, for example, where two controller cards 200A and 200B are included in system 100, the system is implemented to give preferred status to slot 114 as the card that would assume primary status. Thus, if both cards 200A and 200B are plugged into the system as shown in FIG. 2, when the system is powered, then controller card 200B assumes primary status, and controller card 200A assumes non-primary status.

Alternatively, controller card 200A may be the primary card and controller card 200B may be the non-primary card, if the system is implemented such that slot 112 is given preferred status. The primary card, is responsible for configuring buses 108, 110, as well as providing other services such as bus addressing and internal card termination. The non-primary card is responsible for services such as bus addressing and internal card termination, as well.

In some embodiments, the non-primary card is not responsible for configuring buses 108, 110, and responds to bus operation commands from the primary card, instead of initiating those commands itself. The primary and non-primary cards are physically and electrically the same, with "primary" and "non-primary" denoting functions of the bus controller cards rather than unique physical configurations. Due to compatibility considerations, backplane 260 may be adapted to receive in bus controller slots 112 and 114 various controller card models. Different models utilize different voltage differential interfaces to buses 108 and 110, for example.

In some embodiments, backplane 260 may be included in a Hewlett-Packard HVD10 disk enclosure and may be adapted to receive either HVD10 or SC10 bus controller cards, for example. The HVD10 card utilizes a high voltage differential (HVD) interface to the buses 108 and 110. The SC10 utilizes a low voltage differential (LVD) interface to the buses 108 and 110.

In one or more embodiments, controller cards HVD10 and SC10 may be considered incompatible, in that the system may not be able to support two different types of cards at the same time. Thus, in circumstances when the controller cards plugged into the system are incompatible, the newly plugged in card will disengage from the system, so as not to corrupt the data flow within the system. According to one aspect of the system, Detect In 1 and Detect In 2 signals are used to determine the type of the controller card. Thus, if the signals detected for both controller cards match, then the system knows that the cards are compatible. Buses 108 and 110 may be SCSI buses in this embodiment. Different models of controller cards and buses can be utilized if desired, however.

Figure 3:
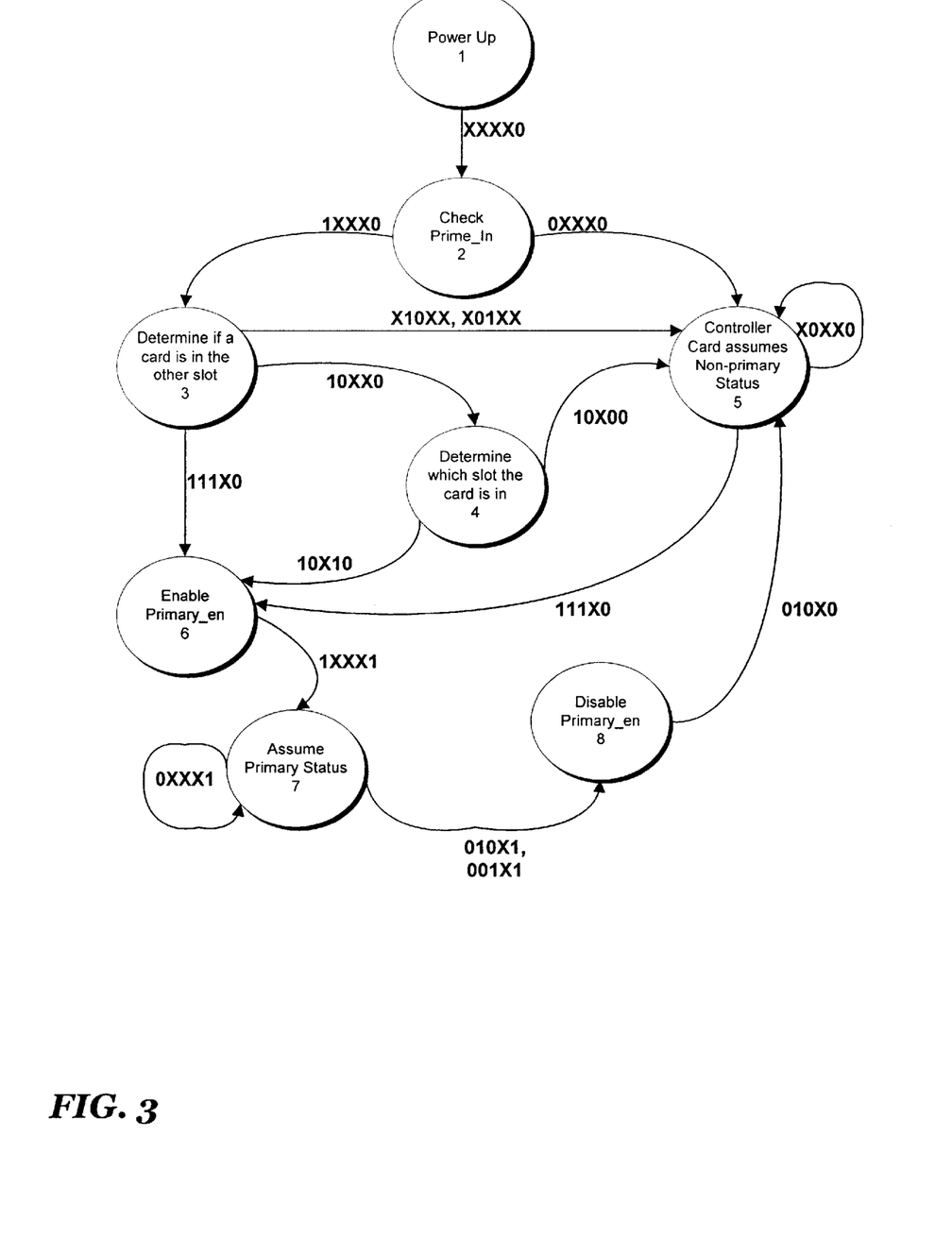
FIG. 3 is a state diagram illustrating the various states under which a controller card assumes primary or secondary status, in accordance with one or more embodiments of the system.

Generally, when multiple peripheral devices and controller cards are included in a system, such as system 100 illustrated in FIG. 1, one or more of the following actions or events may take place: one or more peripheral devices can be attached to or removed from the system, one or more controller cards may be attached to or removed from the system, or the power to the system may be interrupted. Because these events can cause a delay or interruption in communication of data in the system, to prevent data corruption or data loss in system 100, the system is implemented and electrically connected to detect the above events. FIG. 3 illustrates a method for determining the status of controller cards 200A and 200B upon occurrence of one or more of the above events, as further provided herein.

Table 1, below, includes a summary of the various possibilities for the above different actions or events and the corresponding card status under each circumstance. A configuration of 1 indicates that a controller card is in the corresponding interface slot; a configuration of 0 indicates that a controller card is not in the corresponding interface slot. Only one of the cards 200A or 200B assumes primary status, at each time. Thus, the card that does not assume primary status is the slave card. A power up action refers to turning on the power. A power cycle action refers to a power interruption in the system. That is, for example, turning the power off and back on. A card is hot plugged in an interface slot if it is inserted into the slot while the system is powered and functional.

TABLE 1

| Initial Configuration | | | Resulting Configuration | | |
|---|---|---|---|---|---|
| Slot 112 | Slot 114 | Action/Event | Slot 112 | Slot 114 | PRIMARY STATUS |
| 1 | 0 | Power Up | 1 | 0 | Card in slot 112 assumes Primary Status |

TABLE 1-continued

| Initial Configuration | | | Resulting Configuration | | |
|---|---|---|---|---|---|
| Slot 112 | Slot 114 | Action/Event | Slot 112 | Slot 114 | PRIMARY STATUS |
| 1 | 0 | Card Hot Plugged into Slot 114 | 1 | 1 | Card in slot 112 retains Primary Status |
| 1 | 1 | Card Hot Removed from Slot 112 | 0 | 1 | Card in slot 114 assumes Primary Status |
| 0 | 1 | Card Hot Plugged into Slot 112 | 1 | 1 | Card in slot 114 retains Primary Status |
| 1 | 1 | Power Cycle | 1 | 1 | Card in slot 114 retains Primary Status |
| 1 | 1 | Card Hot Removed from Slot 114 | 1 | 0 | Card in slot 112 assumes Primary Status |
| 1 | 0 | Card Hot Plugged into Slot 114 | 1 | 1 | Card in slot 112 retains Primary Status |
| 1 | 1 | Power Cycle | 1 | 1 | Card in slot 114 assumes Primary Status |
| 1 | 1 | Card Hot Removed from Slot 112 | 0 | 1 | Card in slot 114 retains Primary Status |
| 0 | 1 | Power Cycle | 0 | 1 | Card in slot 114 is Primary |

It should be noted, however, that Table 1 is not a comprehensive summary of all possible configurations and other configurations may be possible depending on the type of action or event and the order in which such actions or events may take place. The electrical connection illustrated in FIG. 2 in combination with the method illustrated in FIG. 3 are implemented to provide the desirable results under various circumstances as further described below.

Referring to FIG. 2, controller card 200A is electrically connected to backplane 260 through slot 112, as shown. Controller card 200B is similarly connected through slot 114. Each card 200A and 200B, advantageously, includes pins adapted to transmit and receive electric signals to and from backplane 260 via pin connectors included in slots 112 and 114, for receiving said pins. Electrical signals Slot Identifier A, Slot Identifier B, Primary In A, Detect In 1 A, Detect Out 1 A, Detect In 2 A, and Detect Out 2 A are received or transmitted via pins included in controller card 200A.

Similarly, electrical signals Primary In B, Detect In 1 B, Detect Out 1 B, Detect In 2 B, and Detect Out 2 B are received or transmitted via pins included in controller card 200B. Pins that drive the Primary In A and Primary In B signals are electrically connected through backplane 260. As such, a change in status of Primary In A results in a direct change in the status of Primary In B.

Generally, when no cards are plugged into the system, the Primary In signals A and B are driven high by backplane 260 and indicate that no primary status has been designated for any of the slots 112 or 114. In one or more embodiments, a voltage differential of 5 Volts indicates a high signal. Further, detect out signals (e.g., Detect Out 1 A, Detect Out 1 B, Detect Out 2 A, and Detect Out 2 B) are driven high by backplane 260, unless the signals are grounded as the result of insertion of one of cards 200A or 200B into one of the slots 112 or 114.

For example, if controller card 200A is inserted into slot 112 then signals Detect Out 1 A and Detect Out 1 B are grounded as shown in FIG. 2, and driven low as a result. In one or more embodiments, a voltage differential of 1 Volt indicates a low signal. Similarly, insertion of a controller card into slot 114 will result in Detect Out 1 B and Detect Out 2 B signals to be driven low. If the controller card is in slot 112, then Slot Identifier A is low. If the controller card is in slot 114, then Slot Identifier B is high. The signal implementations may be different in different embodiments of the invention, if desired. That is, low and high signals may be used to indicate a status opposite to that described here, but achieve the same results as a whole using the appropriate logical analysis and circuitry.

As shown in FIG. 2, in accordance with one aspect of the invention, detect in signals implemented on controller cards 200A are electrically connected to detect out signals generated by controller card 200B, when both cards 200A and 200B are plugged into lots 112 and 114. Likewise, detect in signals implemented on controller cards 200B are electrically connected to detect out signals generated by controller card 200A. For example, backplane 260 is electrically designed so that the output signals Detect Out 1 B and Detect Out 2 B from controller card 200B are respectively received as input signals Detect In 1 A and Detect In 2 A in controller card 200A. In a similar manner, signals Detect Out 1 A and Detect Out 2 A from controller card 200A are respectively received as input signals Detect In 1 B and Detect In 2 B in controller card 200B. When one of the out put signals above is driven low, so is the corresponding input signal.

As referenced earlier, various configurations of Detect In 1 and Detect In 2 signals can be implemented to indicate that a card is present in an interface slot and whether that card is compatible with the other cards already in the system. In accordance with embodiments of the system, if both Detect In signals are high then no card is present in the corresponding slot. If one of the Detect In signals is low then a card is present in the corresponding slot. However, in certain embodiments of the system, the card is deemed compatible only if both signals are low. Otherwise, the card is deemed incompatible and is not connected to the system.

Each card controller includes a primary card identifier (e.g., primary card identifier 500A and 500B) and a tristate buffer (e.g., tristate buffers A and B). The primary card identifiers (PCIs) and the tristate buffers may be implemented independently or integrated within other system components. For example, in one embodiment, PCI 500A and tristate buffer A, shown in FIG. 2, can be implemented as part of the integrated circuitry included in controller 218A, shown in FIG. 1. Similarly, PCI 500B and tristate buffer B can be implemented as part of the integrated circuitry included in controller 218B. Each PCI receives three input signals, primary in, detect in, and detect out, and generates an output signal, primary enable.

The output signals referred to as Primary Enable A (generated by PCI 500A) and Primary Enable B (generated by PCI 500B) are respectively received as input signals by tristate buffer A and tristate buffer B. The primary enable signals are used to activate the tristate buffers A and B. If a tristate buffer is activated it then generates a low output signal. The output signals generated by tristate buffers A and B are respectively referred to as Primary Out A and Primary Out B. If Primary Out A is low, it drives Primary In A low. Similarly, if Primary Out B is low, it then drives Primary In B signal low.

If a tristate buffer is not activated then Primary Out signals A and B are tristated. In accordance with one or more embodiments, a tristated buffer is equivalent to an open circuit. Thus, if a tristate buffer is not activated then it has no effect on the status of primary in signals going into PCIs 500A and 500B. In accordance with one aspect of the system, a tristate buffers is activated if the corresponding PCI determines that the controller card is to assume primary status. As such, a primary enable signal activates a corresponding tristate buffer in a controller card plugged in an interface slot (e.g., slot 112). As the result of activation of the tristate buffer, the primary out signal for the tristate buffer is driven low.

For example, presume that controller card 200A is plugged in slot 112 and that slot 114 is empty. In such configuration, controller card 200A assumes primary status, and backplane 260 drives Detect In 1 A and Detect In 2 A signals high. If controller card 200B is plugged in slot 114, then Detect In 1 A and Detect In 2 A are driven low because Detect Out 1 B and Detect Out 2 B are grounded as a result of insertion of controller card 200B in slot 114. When Detect In 1 A and Detect In 2 A are driven low, PCI 500A detects that card 200B, for example, has been plugged in slot 114.

Certain embodiments of the system have been implemented to assign primary status to the controller card in slot 114 if a controller card is present therein. According to such implementation, controller card 200B assumes primary status upon insertion and controller card 200A assumes non-primary status. In other embodiments, controller card 200A maintains its primary status, unless there is a power interruption within the system. If the system enters such state, then once the power is resumed controller card 500B plugged into the preferred slot, here slot 114, for example, assumes primary status. PCIs 500A and 500B monitor the state of the system to determine if there are any changes in the status of a controller card.

Table 2, provides an example of the various system configurations and states when a Primary Enable signal is active or inactive. The content of Table 2 are discussed in further detail below with reference to the state diagram illustrated in FIG. 3.

TABLE 2

| Present State | Primary In | Detect In 1 | Detect In 2 | Slot Identifier | Primary Enable | Future State |
| --- | --- | --- | --- | --- | --- | --- |
| 1- Power Up | X | X | X | X | Inactive | 2- Check Primary In |
| 2- Check Primary In | High | X | X | X | Inactive | 3- check other slot for card |
| 2- Check Primary In | Low | X | X | X | Inactive | 5- Controller card assumes non-primary status |
| 3- Determine if a card is in other slot | X | High | Low | X | X | 5- Controller card assumes non-primary status |
| 3- Determine if a card is in other slot | High | Low | X | X | Inactive | 4- Determine which slot the card is in |
| 3- Determine if a card is in other slot | High | High | High | X | Inactive | 6- Activate Primary Enable |
| 4- Determine which slot the card is in | High | Low | X | Low | Inactive | 5- Controller card assumes non-primary status |
| 4- Determine which slot the card is in | High | Low | X | High | Inactive | 6- Activate Primary Enable |
| 5- Controller card assumes non-primary status | High | High | High | X | Inactive | 6- Activate Primary Enable |
| 5- Controller card assumes non-primary status | X | Low | X | X | Inactive | 5- Controller card assumes non-primary status |
| 6- Activate Primary Enable | High | X | X | X | Active | 7- Assume Primary Status |

TABLE 2-continued

| Present State | Primary In | Detect In 1 | Detect In 2 | Slot Identifier | Primary Enable | Future State |
|---|---|---|---|---|---|---|
| 7- Assume Primary Status | Low | High | Low | X | Active | 8- Deactivate Primary Enable |
| 7- Assume Primary Status | Low | X | X | X | Active | 7- Assume Primary Status |
| 8- Deactivate Primary Enable | Low | High | Low | X | Inactive | 5- Controller card assumes non-primary Status |

As discussed, activation of tristate buffer A, drives Primary Out A and therefore Primary In A signals low. Pins that drive Primary Signal A and B are electrically connected through backplane 260, as a result when either of the tristate buffers A or B are activated then both Primary In signals A and B are driven low. If Primary In signals A and B are low, then the PCIs 500A and 500B detect that at least one controller card 200A or 200B is plugged in one of the slots 112 or 114 and as a result the status of the primary card remains unchanged. The reverse is also true, that is when at least one of the controller cards 200A or 200B is plugged in, Primary Signals A and B are driven low and remain low unless one of the cards is removed.

If one of the cards 200A or 200B is removed and the card removed had primary status, then the status of the Primary Signals A and B changes from low to high, at least temporarily, until the system determines the status of the cards and restores the low status of Primary Signals A and B. If no card is plugged into the system then Primary In signals are driven high by backplane 260. Thus, when the status of the Primary Signals A and B changes from low to high, then PCIs 500A and 500B detect that there is a change in the primary card status or that one of the controller cards 200A or 200B has been removed, for example.

Referring to Table 1, presume a resulting configuration where both controller cards 200A and 200B are plugged in, for example. As illustrated in Table 1, depending on the initial configuration, one of the cards has primary status. For example, if card 200B was hot plugged in slot 114 when initially card 200A was plugged in slot 112, then card 200A retains its primary status. If consequently, card 200A is hot removed from slot 112, then referring to FIG. 2, Detect Out 1 A and Detect Out 2 A signals are no longer grounded and therefore Detect In 1 B and Detect In 2 B signals are drive high by backplane 260. Also removal of card 200A from slot 112 causes Primary In B signal to be driven high by backplane 260.

In a similar manner, other configurations can be associated with changes in signals that result in the retention or a change in the primary status of a controller card as illustrated in Table 1. A review of FIGS. 3 and 4 in light of information provided in Tables 1 and 2 provides a better understanding of the method by which the status of controller cards 200A and 200B are determined, in accordance to one or more embodiments of the invention.

Method for Determining and Designating Card Status

FIG. 3 is a state diagram illustrating the various states under which a controller card assumes primary or secondary status, in accordance with one or more embodiments of the system, and as set forth in table 2. As illustrated in FIG. 3, eight different states are identified within the system. The lines connecting the states are labeled to represent the status of signals Primary In, Detect In 1, Detect In 2, Slot Identifier, and Primary Enable for a controller card, in accordance with values recorded in table 2. Thus, for example, a line drawn between state 1 and 2 labeled "XXXX0" indicates that Primary Enable signal at state 1 is inactive. A value of 1 for the Primary Enable signal indicates an active status. Values of 0 and 1 for the other signals in table 2 indicates a low or a high signal, respectively.

Referring to FIGS. 2, 3 and table 2, when a first controller card is plugged in an interface slot, upon powering up the system, the primary enable signal for the first controller is deactivated (XXXX0). At state 2, the status of the primary in signal for the first controller card is determined. If the primary in signal is high (1XXX0), it is an indication that no controller card has assumed primary status; this leads to state 3. Otherwise, if the primary in signal is low (0XXX0), then it is an indication that a second controller card is plugged in another interface slot and that the second controller card has already assumed primary status. Thus, at state 5, the first controller card assumes non-primary status.

At state 3, no card has assumed primary status, so the system monitors detect in 1 and detect in 2 signals to determine if a controller card is plugged into another slot. This state may occur if both interface slots include a controller card when the system is powered up. At state 3, if detect in signals indicate that the other interface slot includes a second controller card that is not compatible with the first controller card (X10XX, X01XX), then the first controller card assumes non-primary status. Alternatively, if at state 3 no card has assumed primary status, but detect in signals indicate that a second controller card is plugged in the other slot (10XX0) then, at state 4, the primary card identifier for the first controller card checks the slot identifier signal to determine which slot the card is in. Otherwise, if at state 3 no card has assumed primary status, and detect in signals indicate that the other slot is empty (111X0) then the system moves to state 6 and enables the primary enable signal for the first controller card to indicate that the first controller card is primary.

At state 4, primary in signal is still high, indicating that no card has yet assumed primary status. Thus, at state 4, the primary card identifier for the first controller card checks the slot identifier signal to determine which slot the first controller card is in. If the first controller card is in slot 112 (10X00) then it assumes non-primary status, at state 5, if slot 112 is the interface slot with non-primary status preference as discussed earlier. If the first controller card is in slot 114 (10X10) then at state 6 the primary enable signal for the first controller card is enabled to indicate that the first controller card is primary if slot 114 is the interface slot with primary status preference. As discussed earlier, whether one of the interface slots is implemented to assume a primary or non-primary status is based on preference and makes no difference to the operation of the system. Thus, in other embodiments of the system, slot 112 can be implemented as the preferred slot to assume primary status.

If the system moves to state 6 from state 4, then the primary enabled signal is activated to indicate that the first card controller has assumed primary status. Alternatively, if the system moves to state 5 from state 4, then the primary enable signal remain inactive, while the other slot is not empty (X0XX0) to maintain the primary status of the first controller card until system status changes. At state 6, if primary in signal indicates that no controller cards has yet assumed primary status and the primary enable signal is active (1XXX1) then the first controller card assumes primary status at state 7, as shown.

At state 7, if the primary card identifier detects that an incompatible card is added to the system (010X1, 001X1) as indicated by detect in 1 and detect in 2 signals, then the system moves to state 8, and the primary card identifier deactivates the primary enable signal. Otherwise, at state 7, as long as primary in signal indicates that a card has assumed primary status and that the primary enable signal remains active (0XXX1), the system continues to monitor detect in signals for any change in system status (e.g., addition or removal of a control card from the other slot).

At state 8, primary enable signal is inactive indicating the insertion of an incompatible controller card in the other slot (010X0), thus the tristate buffer does not generate a primary out signal and the system moves to state 5, where the first controller card gives up primary status and the controller card in the other slot assume primary status until such time that it is removed from the system.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A communications system comprising:

one or more communication buses implemented on a backplane having one or more interface slots;

one or more controller cards communicating with the communication buses through said one or more interface slots, each controller card comprising:
   a controller; and
   at least two independent communication channels provided for connecting a host with said one or more communication buses, wherein the controller determines and designate the status of said one or more controller cards such that:
   a first controller card is designated to have primary status if the first controller card is inserted in a first interface slot while remaining interface slots are empty;
   the first controller card in said first slot retains primary status while one or more controller cards are added or removed from said remaining slots: and
   a second controller card having a non-primary status inserted in a second interface slot assumes primary status after a power interruption, if the second interface slot is designated as the slot to assume primary status after a power interruption.

2. The communication system of claim 1, wherein the controller further determines end designates the status of one or more controller cards inserted in said one or more slots such that a second controller card having a non-primary status inserted in a second interface slot assumes primary status if the first controller card is removed from the first interface slot.

3. The communication system of claim 2, wherein the controller included in the first controller card comprises:

a primary card identifier for detecting the presence of the second controller card in the second interface slot; and a tristate buffer for assigning or maintaining primary status of the first controller card.

4. The communication system of claim 3, wherein the primary card identifier determines the presence of the second controller in the second interface slot based on one or more signals driven through the backplane.

5. The communication system of claim 4, wherein the signals driven through the backplane are changed by insertion of the second controller in the second interface slot.

6. The communication system of claim 5, wherein the signals are driven high by the backplane before the insertion of the second controller in the second interface slot.

7. The communication system of claim 6, wherein the signals are grounded and driven low after the insertions of the second controller in the second interface slot.

8. The communication system of claim 3, wherein the primary card identifier after detecting the presence of the second controller card in the second interface slot activates the tristate buffer.

9. The communication system of claim 8, wherein the tristate buffer if activated generates a primary signal forwarded to the second interface slot indicating that an interface slot includes a controller card with primary status.

10. The communication system of claim 9, wherein the primary signal generated by the tristate buffer drives a primary input signal to the primary card identifier, the primary input signal for detecting a change in the primary status.

11. The communication system of claim 10, wherein a change in the value of the primary input signal indicates the removal of a controller card from an interface slot.

12. The communication system of claim 11, wherein when the tristate buffer is activated then the primary input signal is driven low.

13. The communication system of claim 12, wherein when the second controller card is removed from the second interface slot, the primary card identifier detects that the second interface slot is empty and deactivates the tristate buffer.

14. The communication system of claim 13, wherein the primary input signal is driven high by the backplane when the second controller card is removed from the second interface slot.

15. The communication system of claim 14, wherein when primary input signal is driven from low to high, the primary card identifier determines that the first controller card is the only card in the system and causes the first controller card to assume primary status.

16. The communication system of claim 15, wherein no signals are generated by the tristate buffer when the tristate buffer is inactive.

17. A communications system with a plurality of interface slots, said system including control logic that determines and designates the status of one or more controller cards inserted in said one or more slots such that:

a first controller card is designated to have primary status if the first controller card is inserted in a first interface slot while the other interface slots are empty;

the first controller card in said first slot retains primary status while one or more controller cards are added or removed from said remaining slots; and a second controller card having non-primary status inserted in a second interface slot assumes primary status after a power interruption, if the second interface slot is designated as the slot to assume primary status after a power interruption.

18. The communication system of claim 17, wherein the control logic determines and designates the status of one or more controller cards inserted in said one or more slots such that the second controller card having non-primary status inserted in a second interface slot assumes primary status if the first controller card is removed from the first interface slot.

* * * * *